United States Patent [19]

Aine

[11] Patent Number: 4,691,566
[45] Date of Patent: Sep. 8, 1987

[54] IMMERSED THERMAL FLUID FLOW SENSOR

[76] Inventor: Harry E. Aine, 30600 Page Mill Rd., Los Altos, Calif. 94022

[21] Appl. No.: 765,839

[22] Filed: Aug. 15, 1985

Related U.S. Application Data

[63] Continuation-in-part of Ser. No. 666,040, Dec. 7, 1984, abandoned.

[51] Int. Cl.⁴ .............................................. G01F 1/68
[52] U.S. Cl. ................................................... 73/204
[58] Field of Search ....................... 73/204; 338/25, 28

[56] References Cited

U.S. PATENT DOCUMENTS

| | | | |
|---|---|---|---|
| 1,487,356 | 3/1924 | Packard | 73/204 |
| 3,754,201 | 8/1973 | Adams | 73/204 X |
| 3,931,736 | 1/1976 | Olmstead | 73/204 |
| 3,992,940 | 11/1976 | Platzer, Jr. | 73/204 |
| 4,214,478 | 7/1980 | Lauterbach | 73/204 |
| 4,338,814 | 7/1982 | Romann | 73/204 X |
| 4,345,465 | 8/1982 | Gruner et al. | 73/204 |
| 4,397,179 | 8/1983 | Romann | 73/204 X |
| 4,403,506 | 9/1983 | Lauterbach | 73/204 |
| 4,498,337 | 2/1985 | Gruner | 73/204 |
| 4,502,339 | 3/1985 | Horn | 73/204 X |
| 4,542,650 | 9/1985 | Renken et al. | 73/204 |

Primary Examiner—Herbert Goldstein
Attorney, Agent, or Firm—Harry E. Aine

[57] ABSTRACT

An immersion-type thermal fluid flow sensor is disclosed in which the temperature dependent sensing resistor means is carried from a flexible ribbon-shaped septum immersed in the flow and arranged in a spiral, meander or other geometrical configuration to partition the total flow passageway into a plurality of parallel flow portions. In one embodiment, the partitioned flow passageways are dimensioned to have a length to cross-sectional dimension ratio for providing laminar flow conditions over the operating flow range of interest. In another embodiment, a heater is provided for heating the septum to a temperature near that of the sensing resistor to reduce the time constant of the flow measurement. In another embodiment, a thermal loading element is coupled in heat exchanging relation with the sensing resistors for increasing the critical flow rate and thus for increasing the operating range of the flow regime wherein the temperature difference ΔT between the upstream and downstream resistors is a direct function of mass flow rate. Also, in another embodiment, thermal gradient shields shield the flow sensing resistors from external thermal gradients.

27 Claims, 26 Drawing Figures

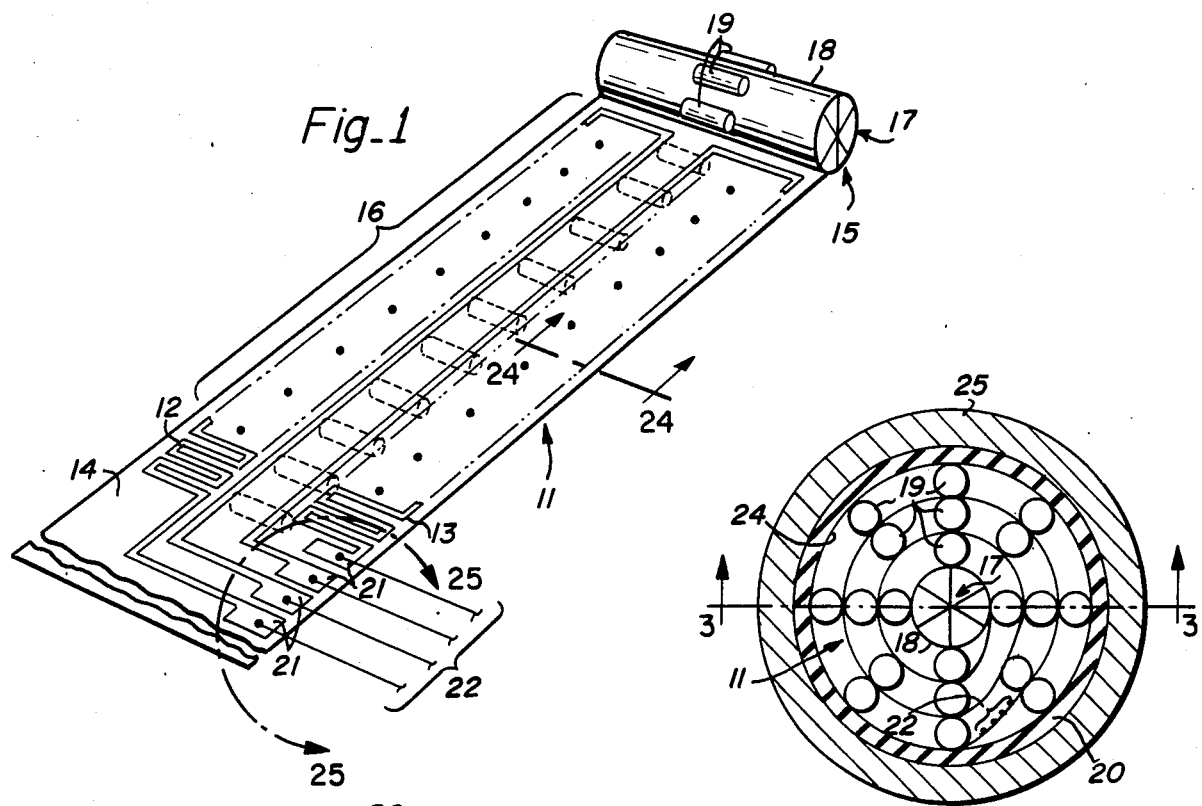
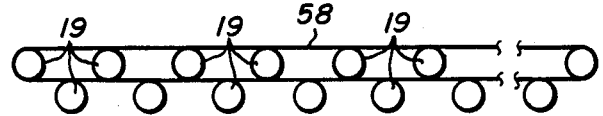
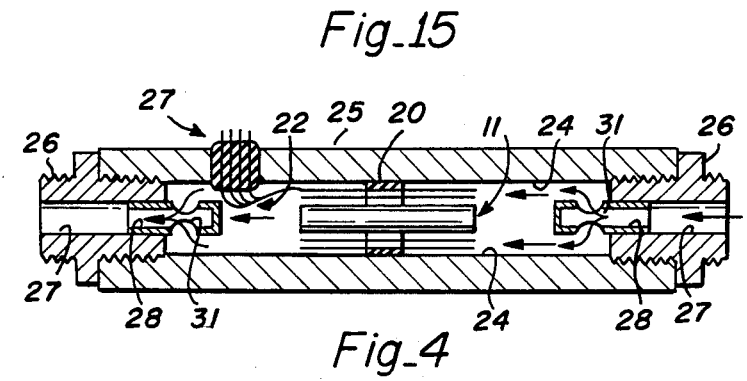
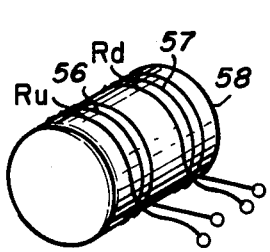
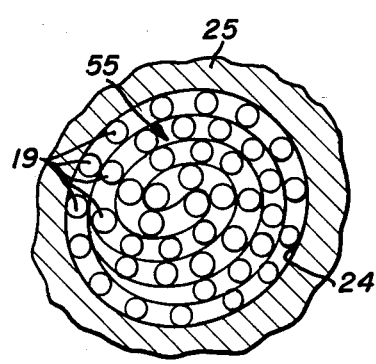
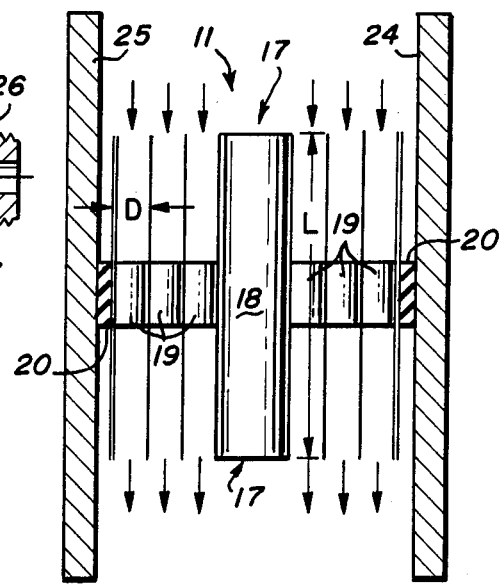

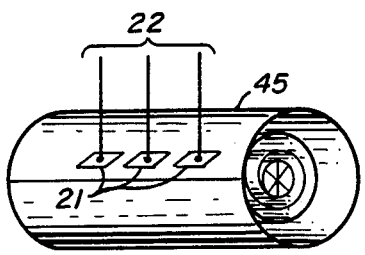
Fig_9
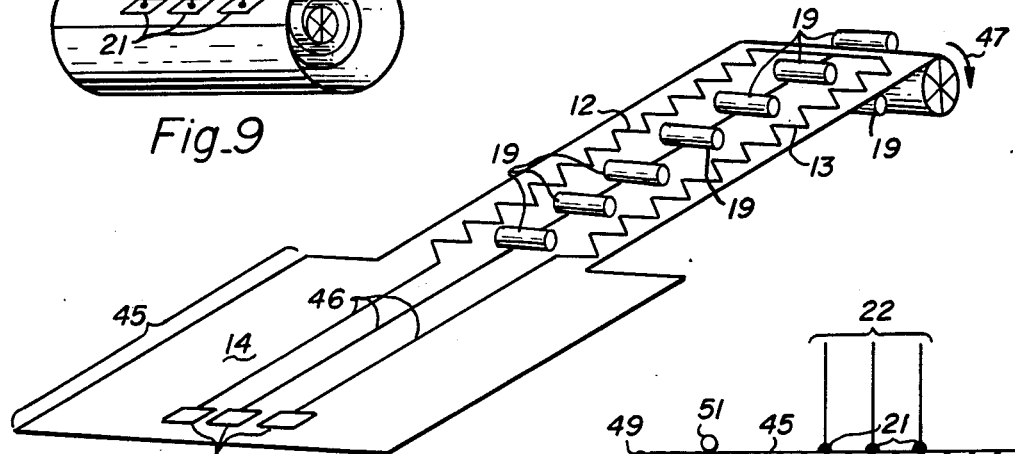
Fig_8
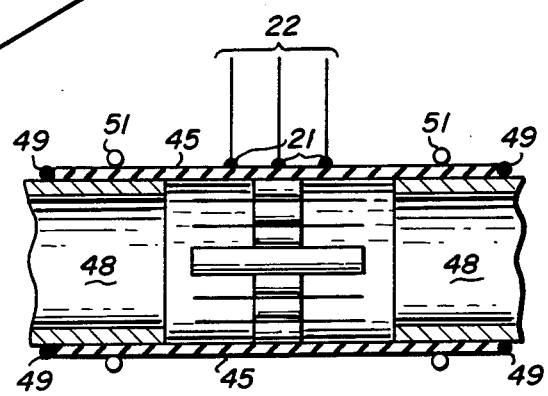
Fig_10
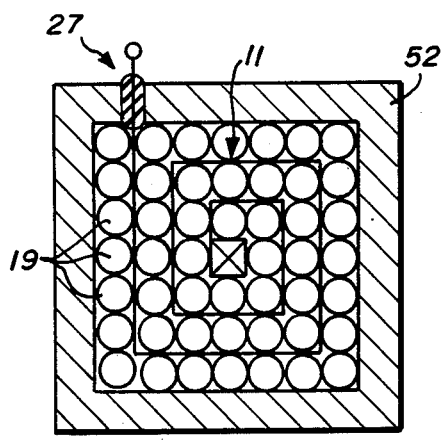
Fig_11
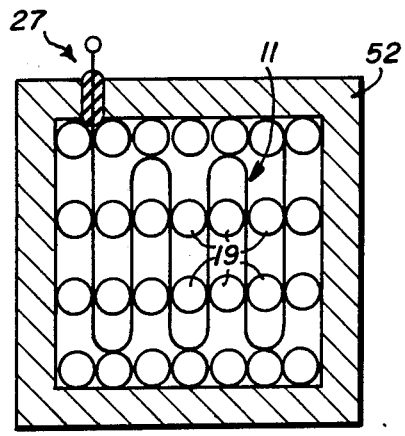
Fig_12
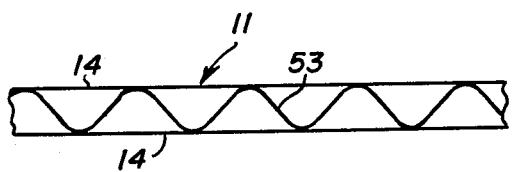
Fig_13

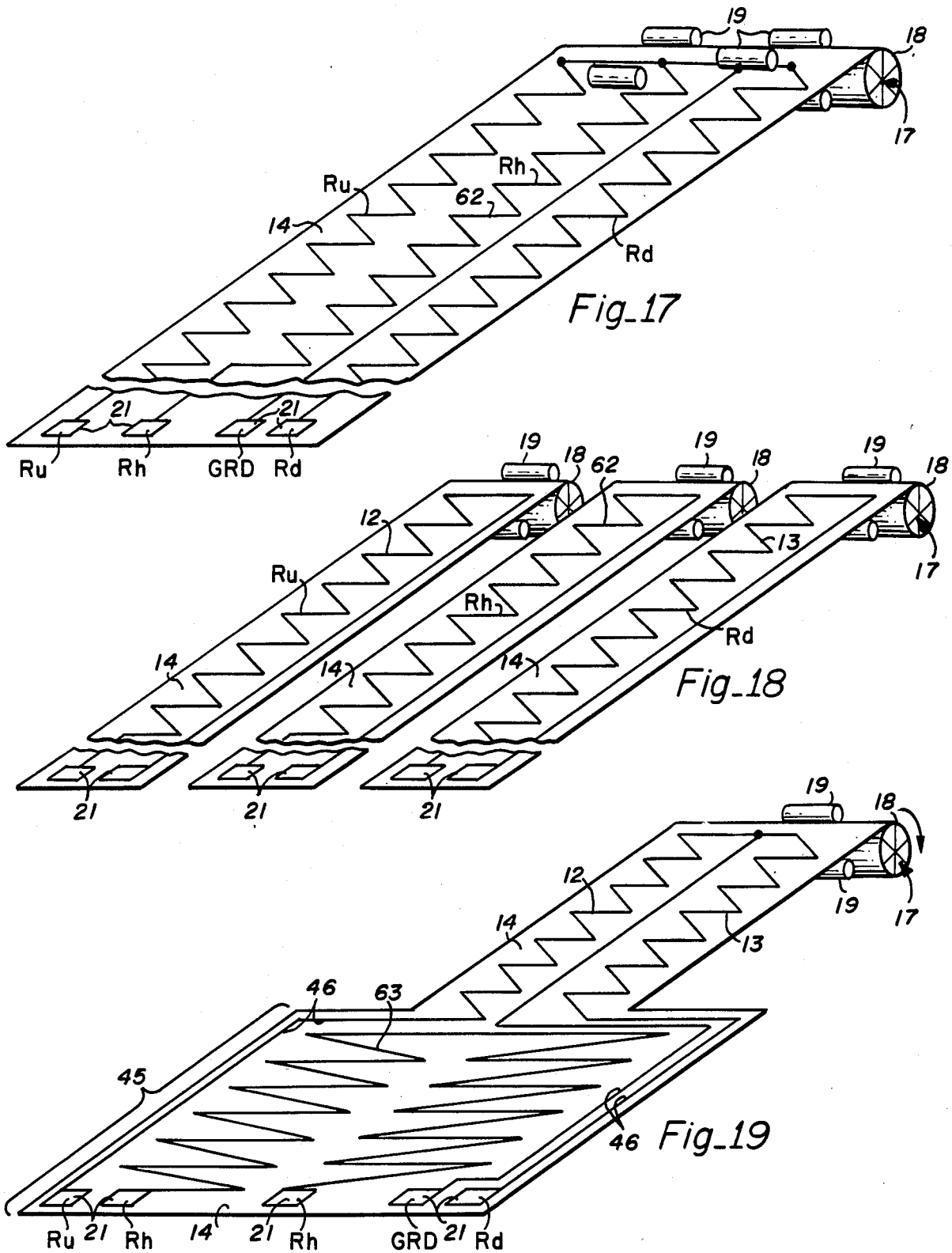
Fig_17
Fig_18
Fig_19

IMMERSED THERMAL FLUID FLOW SENSOR

RELATED CASES

The present invention is a continuation-in-part invention of parent U.S. patent application U.S. Ser. No. 666,040 filed Dec. 7, 1984, now abandoned.

BACKGROUND OF THE INVENTION

The present invention relates in general to thermal fluid flow sensors of the type wherein the sensor is immersed in the flow to be measured.

DESCRIPTION OF THE PRIOR ART

Heretofore, fluid flow sensors have been proposed wherein a pair of thin film resistors were deposited upon a thermally insulative sheet of plastic material bonded over a frame for supporting the thin plastic material. Current is passed through one of the resistors for heating it to an elevated temperature relative to the other and the two resistors are immersed in the flow of fluid to be measured. The power required for maintenance of a pre-determined temperature difference between the two resistors is evaluated as a measurement of the quantity of fluid flow.

Others have made similar proposals wherein the thin substrate supporting the resistors is held in a frame structure mounted in streamline frame members and disposed across the fluid conduit within which the measurement is made. Such a disclosure is found in U.S. Pat. No. 4,345,465 issued Aug. 21, 1982.

Others have mounted the thin film sensing resistors on airfoils located proximate flow restrictions for enhancing laminar flow conditions over the sensing resistors. Such a disclosure is found in U.S. Pat. No. 4,317,365 issued Mar. 2, 1982.

It is also known from the prior art to provide thermal sensors by way of wire grids or thin films, one upstream and one downstream of the heating element for detecting the asymmetry of the thermal profile in the vicinity of the heater as a result of the flow of fluid in the duct. Flow meters of this type are disclosed in: U.S. Pat. No. 4,332,165 issued June 1, 1982; U.S. Pat. No. 4,399,698 issued Aug. 23, 1983; U.S. Pat. No. 4,384,484 issued May 24, 1983; U.S. Pat. No. 4,332,157 issued June 1, 1982; Sensors and Actuators, Vol. 3 (1982/83), pgs. 17-22 and Sensors and Actuators, Vol. 2 (1981/82), pgs. 3-16.

Some of the problems associated with the prior art thermal fluid flow sensors are that with regard to artfoil carriers of the thermal sensors, they have not had a good way to mount the carrier in the duct inasmuch as the wire supports, stream line frames, and the like used to support the airfoil disturb the fluid flow patterns over the airfoil resulting in flow separation, with localized flow reversal in the high flow regime, thereby limiting the operable range of the measurements.

SUMMARY OF THE PRESENT INVENTION

The princpal object of the present invention is provision of an improved thermal mass flow meter.

In one feature of the present invention, temperature dependent fluid flow sensing resistor means is carried from a ribbon-shaped flexible septum immersed in the fluid flow passageway so as to partition a preponderance of the flow into a plurality of parallel flow portions, each with a length larger than its characteristic minimum cross-sectional dimension, whereby the fluid flow sensor serves as a flow rectifier.

In another feature of the present invention, the fluid flow sensing resistor means is embedded in a flexible ribbon-shaped flow septum formed by a sandwich of a pair of sheets of organic dielectric material.

In another feature of the present invention, the flexible ribbon-shaped flow septum carrying the flow sensing resistor means is wound into a generally spiral configuration with the axis of revolution of the spiral directed generally parallel to the direction of flow through the sensing resistor means.

In another feature of the present invention, a portion of the flexible ribbon-shaped septum is looped back on itself to define the inside wall of that portion of the fluid passageway containing the temperature dependent fluid flow sensing resistor means.

In another feature of the present invention, the looped backed portion of the flexible ribbon-shaped septum has an opening from the outside surface to expose terminals of the sensing resistor means, whereby the septum serves to define and hermetically seal an electrical feedthrough structure for electrically contacting the fluid flow sensing resistor means through the wall of the defined fluid flow passageway.

In another feature of the present invention, a heater is coupled in heat exchanging relation with the fluid flow temperature dependent sensing resistor for heating the septum to a temperature near to the temperature of the sensing resistor so as to decrease the time constant of the sensor.

In another feature of the present invention, the fluid flow sensing resistor is enclosed in a corrosion resistant metallic envelope made of a flexible metallic ribbon.

In another feature of the present invention, the sensing resistors are coupled in heat-exchanging relation with a thermal loading member for thermally loading the resistors, i.e., increasing the loss of heat from the sensing resistors to the surrounds for increasing the critical flow rate to a higher value and for increasing the operating range of the low flow regime.

In another feature of the present invention, the upstream and downstream fluid flow sensing resistors are shielded from external thermal gradients by means of thermal gradient shield members, thereby rendering the flow measurements less sensitive to external thermal gradients.

Other features and advantages of the present invention will become apparent upon a perusal of the following specification taken in connection with the accompanying drawings wherein:

BRIEF DESCRIPTION OF THE DRAWINGS

FIG. 1 is a perspective view of a flexible ribbon-shaped septum bearing the thermal fluid flow sensing resistor means and incorporating features of the present invention, FIG. 2 is a cross-sectional view of a fluid flow sensor incorporating features of the present invention, FIG. 3 is a longitudinal sectional view of the structure of FIG. 2 taken along line 3—3 in the direction of the arrows, FIG. 4 is a longitudinal sectional view of a housing containing a fluid flow sensor of the present invention, FIG. 8 is a perspective view similar to that of FIG. 1 depicting an alternative embodiment of the present invention, FIG. 9 is a perspective view of the flow sensor of FIG. 8 as wound to provide a spiral sensor portion enclosed within a tubular flow passageway portion, FIG. 10 is a longitudinal sectional view of the flow sensor of FIG. 9 coupled in series with a fluid flow passageway, FIG. 11 is a transverse sectional view of an alternative fluid flow sensor of the present invention, FIG. 12 is a view similar to that of FIG. 11 depicting another alternative embodiment of the present invention, FIG. 13 is a transverse sectional view depicting an alternative spacer for spacing adjacent turns of fluid sensor incorporating features of the present invention, FIG. 14 is a perspective view of an alternative fluid flow sensor of the present invention, FIG. 15 is a transverse sectional view of the structure of FIG. 14 elongated to provide closely spaced adjacent fluid flow sensor portions, FIG. 16 is a transverse sectional view of the sensor of FIGS. 14 and 15 as wound into a spiral configuration, FIG. 17 is a perspective view, partly schematic of an alternative embodiment to the sensor of FIGS. 1-6, and 8-10, FIG. 18 is a perspective view of an alternative embodiment to the structure of FIG. 17, FIG. 19 is a view similar to that of FIG. 8 depicting an alternative embodiment of the present invention.

DESCRIPTION OF THE PREFERRED EMBODIMENTS

Figure 5:
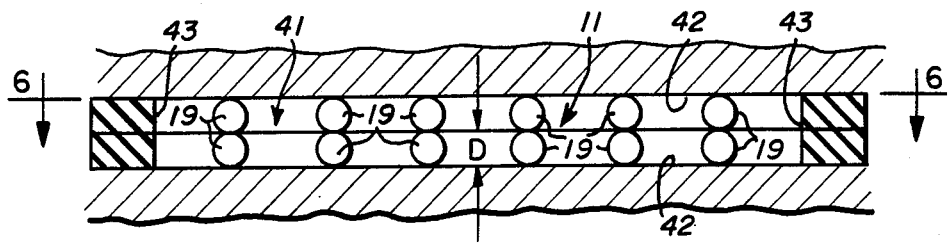
FIG. 5 is a transverse sectional view of an alternative fluid flow sensor of the present invention.

Referring now to FIG. 1, there is shown a mass flow sensor 11 incorporating features of the present invention. The sensor 11 includes an upstream temperature dependent resistor 12 and a downstream temperature dependent resistor 13 captured between two sheets 14 of thin film dielectric material as of polyimide resin. In a typical example, the sheets of polyimide resin 14 are 1 mil in thickness and 1.5" in width and have a length of approximately 6".

A fluid flow sensor comprised of a self-supporting sheet of polyimide material having upstream and downstream sensing resistors is disclosed and claimed in my co-pending U.S. patent application Ser. No. 556,800 filed Dec. 1, 1983.

The inner end of the sensor at 15 is of increased width compared to the main body portion 16 and has opposite marginal edges serrated such that the serrations, when folded inwardly and glued together, form end caps 17 of a central tubular portion 18. Tubular spacers 19, as of 0.100" diameter, are affixed to the underside of the sensor 11 with the tubes 19 having their axes aligned to the direction of fluid flow to be sensed. Spacers 19 each have a length approximately equal to the spacing between the two resistors, i.e., 0.5", and are centrally disposed of the ribbon-shaped sensor 11.

The composite sensor is then wound into a spiral configuration as shown in FIG. 2, with adjacent turns of the spiral separated by means of the spacers 19.

Terminal pads 21 are disposed along one of the marginal edges of the ribbon-shaped sensor 11 and are electrically connected to the ends of the respective resistors 12 and 13 for making electrical connection to the resistors. Leads 22 are bonded to the respective terminal pads 21. The resistors 12 and 13, including their lead portions, are covered by the upper sheet 14 of the sandwich. In a typical example, the upper sheet has a thickness of 0.5 mils and is apertured in registration with the contact terminal pads 21 to allow the electrical leads 22 to be soldered to the pads 21.

In a typical example, the temperature dependent resistors 12 and 13 are formed by photolithography and etching of the temperature dependent resistive material, as of nickel. The nickel material has a thickness, as of 1 mil, and line widths of the serpentine resistor patterns are approximately 1 mil to provide a resistance for each of the resistors 12 and 13 of approximately 15 to 20 ohms.

The spiral wound sensor 11 is wound with one turn of foam insulation 20 and then inserted axially within the central bore 24 of a thermally conductive tubular member 25 as of stainless steel, copper, aluminum, brass or steel.

Tubular member 25 is made relatively massive compared to that of the sensor 11 so as to thermally shield the sensor 11 from thermal gradients.

The spacer tubes 19 can have diameters which vary widely for varying the spacing between adjacent turns of the spiral sensor 11. More particularly, the spacers 19 can have diameters varying from 10 mils to 150 mils or more and are conveniently made of a thin walled material such as organic polymer or polyimide. Spaced adjacent turns of the spiral sensor 11 serve to partition the fluid flow into adjacent flow passageway portions having a characteristic minimum cross-sectional dimension D, small compared to their respective lengths, L. In a preferred embodiment, L is at least three times greater than D so as to rectify the fluid flow passing through the sensor without the requirement of additional external fluid rectifiers or laminar flow members. In a typical example, L is 10×D with D being approximately 0.150". Satisfactory results have been obtained with D as small as 0.010" and L=1.5".

Referring now to FIG. 4, there is shown a mass flow sensor 11 contained within a housing 25 and provided on opposite ends with fluid coupling fittings 26 for coupling the sensor into a fluid passageway or pipe containing the flow to be measured. Fluid flow sensor 11 is affixed as by adhesive to the central region of the housing 25. The four leads 22 are brought out to the internal terminals of an electrical feedthrough 27 which allows various leads to be brought through the wall of the housing 25 in a fluid tight hermetically sealed manner to external circuitry.

The fluid coupling fittings 26 are threadably mated to the threaded internal bore 24 at opposite ends of the housing 25 in a fluid tight manner. Each of the fittings 26 includes a central axial bore 27 through which the fluid to be measured enters and exits the housing 25.

Tubular inserts 28 are carried from the internal bores 27 of the coupling fittings 26 and have their inner ends are closed off by means of end closing wall portions 29. Tubular inserts 28 are transversely bored at 31 to allow the fluid to pass through the inserts 28 into and out of the central bore 24 of the housing 25 while serving as shields for shielding the sensor 11 from external sources of infrared radiation emanating external of the housing 25 and in alignment with the bores 27 in the fittings 26.

In operation, fluid, such as a gas to be measured, is inducted into the housing 25 via one of the input coupling fittings 26. The flow passes through the upstream insert 28 and through the spaces between adjacent turns of the spiral fluid flow sensor 11 and thence exits the housing 25 via the other insert 28 and fluid coupler 26. In the fluid sensor 11, a heating current is passed serially through the sensing resistors 12 and 13 for heating the resistors 12 and 13 to an elevated temperature.

In the absence of any flow of fluid through the sensor 11, a certain thermal profile (spatial thermal distribution) is generated within the flow passageways of the flow sensor 11.

As the flow increases from a low value, the established thermal profile is distorted by the flow which tends to lower the temperature of the upstream resistor 12 and to increase the temperature of the downstream resistor 13, thereby producing a resistive difference between the upstream and downstream resistors as a function of the flow. This difference in resistance tends to increase with increasing flow rate until a certain critical value of flow is reached and thereafter the difference in resistance tends to decrease with increasing flow. This characteristic is shown in greater detail at curve 33 of FIG. 7, with the critical flow point designated at 34.

For the case of curve 33, the upstream and downstream resistors 12 and 13 form a voltage divider comprising one-half of a four-element resistive bridge, the other half being formed by a voltage divider pair of resistors forming the second half of the bridge. Such an electrical circuit is disclosed in an article entitled, "A Calibration System for Calorimetric Mass Flow Devices", J. Phys. E:Scientific Instruments, Vol. 15, 1982, pgs. 213-220 at p. 215.

The bridge is nulled for zero flow and the unbalance of the bridge, which is proportional to the difference in temperature $\Delta T$ between the temperature of the upstream and downstream (Tu-Td) resistors 12 and 13, is measured as a function of flow.

For the sensor configuration of FIGS. 1-4, with an inside diameter of bore 24 of one inch, the critical flow value of approximately 600 standard cubic centimeters per minute (SCCM) is the critical flow rate separating the low flow regime from the higher flow regime.

In the low flow regime, the bridge unbalance, which is proportional to $\Delta T$, is directly related to the mass flow rate $J_m$ by the relation:

$$\Delta T = \frac{P J_m C_p K}{N} \qquad \text{Eq. (1)}$$

where P is the injected power into resistors 12 and 13, $J_m$ is the mass flow, $C_p$ is the specific heat capacity of the gas, K is the system related constant and N is a correction factor which depends on the molecular structure of the gas.

In the high flow regime, i.e., flow rates above the critical flow point 34, $\Delta T$ is an inverse decaying exponential with increasing flow, more particularly, the following relation holds:

$$\Delta T = \frac{P K N}{J_m C_p} \qquad \text{Eq. (2)}$$

Curve 35 shows the output response of the mass flow sensor of FIGS. 1-4 in the low flow regime with constant power of 333 milliwatts and in the range of 0-500 SCCM. On the other hand, curve 36 shows the linear output response in the high flow regime operating from 500 SCCM to 20 liters per minute where the bridge is balanced and the power increased to maintain a certain balanced condition of the bridge. Such an electrical measuring circuit is shown in U.S. Pat. No. 4,332,165 issued June 1, 1982. In this case, the change in power $\Delta P$ necessary to maintain the bridge balance with the increasing flow goes from 0 milliwatts to 760 milliwatts over the flow range of 0.5 to 20 liters per minute. In both regimes, the output response 35 and 36 is linear over the selected operating regime. And, thus, it is seen that the same geometrical configuration can be used to accurately measure flow over a very wide flow regime, i.e., from zero to in excess of 20 liters per minute. This result is achieved without the provision of flow splitters and special bypass tubes.

Figure 6:
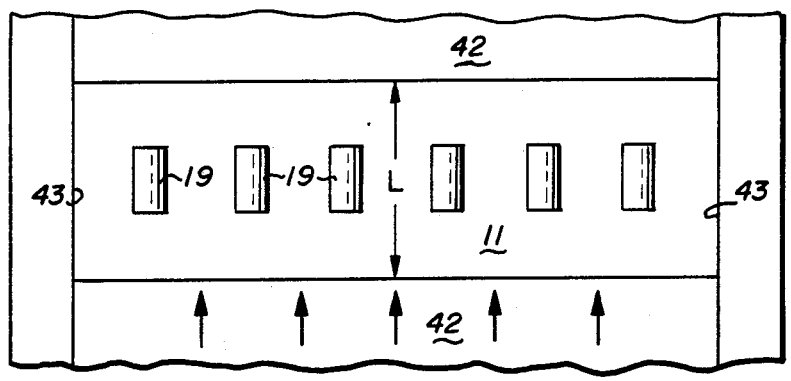
FIG. 6 is a sectional view of the structure of FIG. 5 taken along line 6—6 in the direction of the arrows.

Referring now to FIGS. 5 and 6, there is shown an alternative embodiment of the present invention. In the embodiment of FIGS. 5 and 6, the ribbon-shaped flow sensor 11 of FIG. 1 extends transversely across a rectilinear flow passageway 41, the top and bottom walls of which are defined by parallel plates 42 of a thermally conductive material such as stainless steel, aluminum, brass or the like. The side walls 43 of the flow passageway 41 are defined by thermally insulative block members as of foam insulation, glass, organic polymer or polyimide material. The thermal flow sensor 11 is spaced from the adjacent walls 42 via the intermediary of a plurality of thermally insulative tubular spacer members 19.

As in the embodiment of FIGS. 1-4, the flow sensor of FIGS. 5 and 6 serves to partition the flow passageway 41 into a pair of flow portions on opposite sides of the flow sensor 11. The length of the flow passageways L is preferably at least three times greater than their minimum transverse cross-sectional dimension D for rectifying the flow conditions and allowing the thermal profiles to develop.

In the embodiment of FIGS. 5 and 6, the thermal loading (loss of heat to the surrounds) on the flow sensor 11 is substantially greater than that of the flow sensor 11 of FIGS. 1-4 and as a consequence, the critical flow point 34, at which the flow characteristic changes from the low flow regime to the high flow regime, occurs at a much higher flow rate. This extends the operating range of the low flow regime.

Referring now to FIGS. 8-10, there is shown an alternative embodiment of the present invention. The embodiment of FIGS. 8-10 is similar to that previously described with regard to FIGS. 1-4 with the exception that the carrier sheets 14 include an elongated end portion 45 of an enlarged transverse dimension. In this end region 45, leads 46, which interconnect the terminal pads 21 and the serpentine resistor elements 12 and 23, have been elongated and remain embedded or sandwiched between the two sheets of dielectric material 14. However, the terminal pads 21 are exposed through openings in the top sheet 14 for making electrical connections to the resistors 12 and 13.

The flow sensor is wound into the spiral configuration in the manner as indicated by the arrow 47 and the elongated and widened end region 45 is wrapped over (looped) on itself and glued in that position by a suitable adhesive to form a tubular proportion of the flow conduit which overhangs the ends of the resistors 12 and 13. The resultant tubular portion of the flow sensor 45 is then slipped over the mutually opposed ends of a fluid conduit 48 and is sealed to the conduit 48 via a suitable adhesive 49 and may be additionally clamped to the conduit 48 by means of clamping rings 51 to assure a hermetic gastight or fluid tight seal between the tubular portion 45 of the sensor and the adjacent ends of the conduit 48. The terminals 21 are then bonded to suitable electrical leads 22. In this manner, the elongated leads 46 in terminal portion 45 of the sensor serves to provide a hermetic electrical feedthrough for making electrical connections to the sensor inside the fluid passageway 48.

Referring now to FIG. 11, there is shown an alternative embodiment of the present invention similar to that of FIGS. 1-4 with the exception that the fluid flow sensor 11 is wound into a spiral of rectilinear configuration inside a fluid flow tube 52 of quadrilateral cross-section such as rectangular or square.

Referring now to FIG. 12, there is shown an alternative embodiment of the present invention wherein the flexible ribbon-shaped flow sensor 11 is meandered within the flow tube 52 over a generally serpentine path.

Referring now to FIG. 13, there is shown an alternative spacer structure wherein adjacent turns of the spiral wound sensor 11 are spaced or, as in the case of FIGS. 5 and 6, the sensor 11 is spaced from the adjacent walls of the passageway, via the intermediary of a corrugated member 53. Corrugated member 53 has an axial extent the same as the tubular members 19 and may be made of polyimide sheet material or other dielectric or metal material.

Referring now to FIGS. 14-16, there is shown an alternative fluid flow sensor 55 of the present invention. In this embodiment, the upstream and downstream temperature dependent resistors 56 and 57 are formed by winding temperature dependent resistive wire onto the exterior of a thin flexible tube 58 of dielectric or metallic material such as polyimide resin or stainless steel.

The temperature dependent resistive wire has a relatively small cross-sectional diameter, as of less than 1 mil, and is electrically insulated by means of a thin coating of dielectric material, such as polyimide resin. The wire resistors 56 and 57 are adhered to the exterior of the tubular member 58 by means of a suitable adhesive such as polyimide resin. After winding the resistors 56 and 57, the flexible tubular member 58 is stretched into a flat, elongated geometry as shown in FIG. 15 and tubular spacers 19 are affixed to the tubular member 58, preferably in the region inbetween the upstream and downstream resistors 56 and 57 as previously illustrated with regard to FIGS. 1.

The elongated tubular member 58 is then wound into a generally spiral configuration to form the fluid flow sensor 55 and inserted within the bore 24 of a housing 25 for measuring the flow of fluid through the fluid flow passageway 24.

Although, as thus far described, the flow sensor 11 of the present invention has employed two temperature dependent resistors on a common flexible ribbon-shapred carrier, this is not a requirement. The two resistors 12 and 13 may be connected in series to form a single resistor and operated as a heated probe. In this mode, the loss of heat is measured to give a measure of flow rate or the amount of injected power required to maintain a given temperature yields a measure of flow rate.

In an alternative embodiment, a separate heater resistor is disposed inbetween resistors 12 and 13 of FIG. 1 on the common carrier ribbon 14, as shown in FIG. 17 or all are on separate carrier ribbons 14, as shown in Fig. 18. The ribbons 14 are wound into spiral configurations and immersed in the flow passageway 24 as described above with regard to FIGS. 1-4. With constant heater power applied to the heater resistor 63, the flow response will be as shown by curve 33 of FIG. 7, and can be operated in the low flow regime with constant power or in the high flow regime with variable power to maintain a constant $\Delta T$, Eq. (1) and (2), respectively.

Referring now to FIG. 19, there is shown an alternative embodiment of the present invention wherein a heating element 63 has been incorporated into the leader portion 45 of the flow sensor of FIGS. 8-10. The heater resistor 63 is preferably made of a temperature dependent material, such as nickel, and is similarly sandwiched between the two polyimide sheets 14 with openings in the outer sheet 14 for contacting its terminals at 21.

When the sensor is wound into the spiral configuration, the heater 63 is embedded in the tubular portion 45 surrounding the sensing resistors 12 and 13. The heater 63 is energized with heating current sufficient to heat the tubular portion 45 to a temperature very nearly that of the sensing resistors 12 and 13. In this manner, the loss of heat by the sensing resistors 12 and 13 to the surrounds is reduced to a very low value. This lowers the time constant for the measurement since it essentially thermally decouples the sensing resistors 12 and 13 from the thermal mass of the surrounds.

Figure 21:
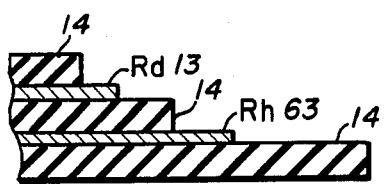
FIG. 21 is an enlarged cross-sectional view of a portion of the structure of FIG. 20 taken along line 21—21 in the direction of the arrows.
Figure 20:
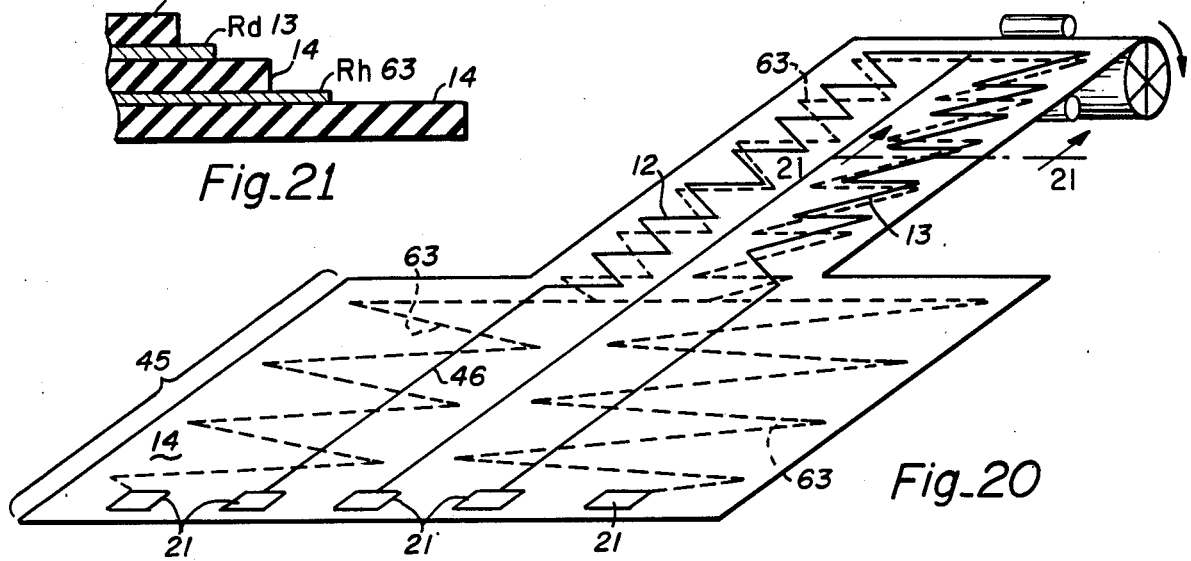
FIG. 20 is a view similar to that of FIG. 19 depicting an alternative embodiment of the present invention.

Referring now to FIGS. 20 and 21, there is shown another alternative embodiment to the sensor of FIG. 19 wherein the heater resistor 63 extends under both sensor resistors 12 and 13. This further reduces the loss of heat from the sensing resistors 12 and 13 to the surrounds for further decreasing the time constant of the flow measurement.

In all of the embodiments of FIGS. 1-6 and 8-21, the adjacent resistor and heater conductors portions are closely spaced, i.e., 0.001", such that their spacing is small compared to the gap spacing D of the flow passageways.

Figure 22:
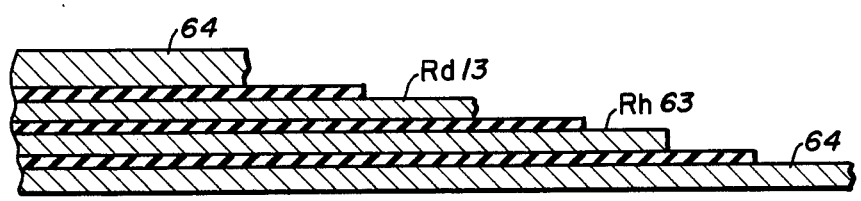
FIG. 22 is a view similar to that of FIG. 21 depicting an alternative embodiment of the present invention.

Referring now to FIG. 22, there is shown an alternative embodiment for use in flow mediums that would be corrosive or destructive to the polyimide resin. In this case, the sensing resistors 12 and 13 and the heating element 63, if any, is enclosed in a metal jacket 64 of a corrosion resistant material such as stainless steel or monel. The jacket 64 is conveniently formed of ribbons of 0.003" thick 18-8 stainless steel sandwiching therebetween the sensing resistors 12 and 13 and the heater 63, if any. The marginal edges of the stainless steel ribbon are bonded together, as by welding or by a suitable adhesive such as epoxy.

Figure 23:
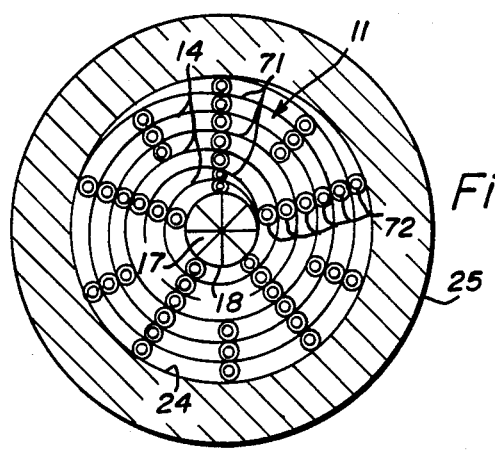
FIG. 23 is a view similar to that of FIG. 2 depicting an alternative thermally loaded embodiment of the present invention.

Referring now to FIG. 23, there is shown an alternative embodiment of the present invention. The embodiment of FIG. 23 is essentially the same as that of FIGS. 1–4 with the exception that a thermal loading member has been interleaved between adjacent turns of the ribbon-shaped septum 14 which carries thereon the upstream and downstream sensing resistors 12 and 13. More particularly, the ribbon-shaped septum 14 is spiral wound in bifilar fashion with a thermal loading ribbon 71. Thermal loading ribbon 71 is preferably made of a thermally conductive material such as aluminum, nickel, copper or the like of essentially the same width as the ribbon shape septum 14. Adjacent turns of the bifilar spirals are spaced apart by means of spacing fibers 72 such as 10 mil diameter monofilament nylon line. The outer turn 71 of the thermal loading member is preferably wrapped around the spiral sensor in a number of turns and placed in good thermal contact with the inside wall of the central bore 24 in the thermally conductive tubular member 25.

Figure 7:
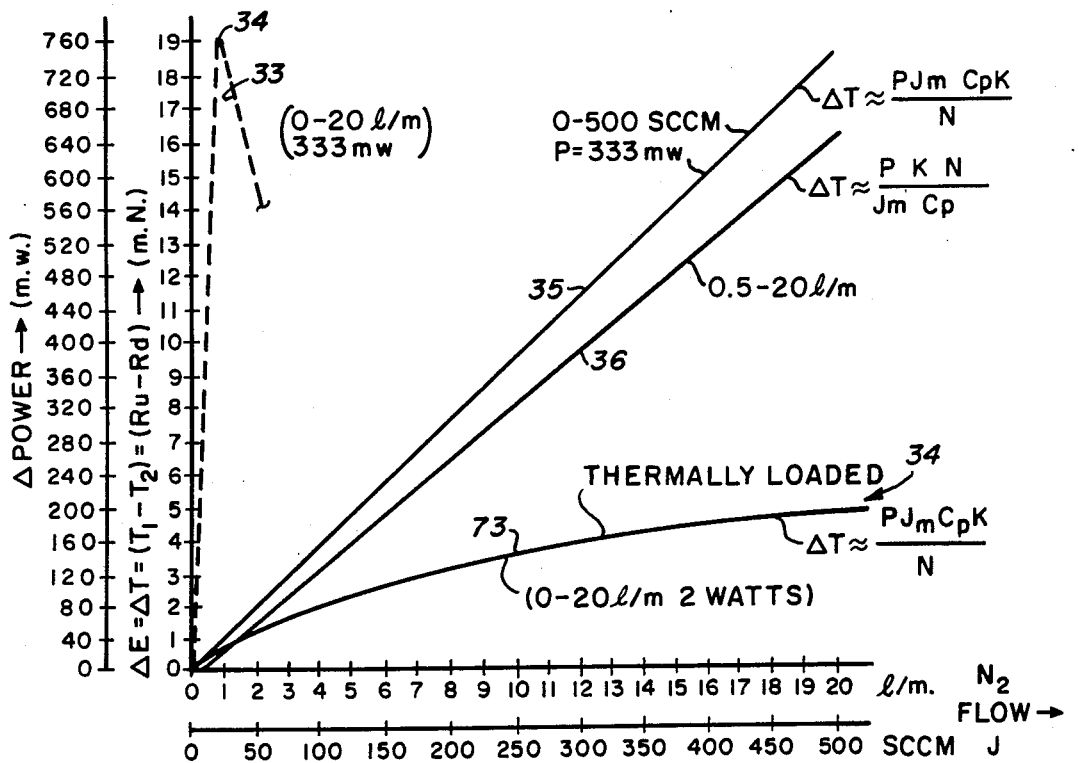
FIG. 7 is a plot of power and temperature differences versus flow rate depicting the flow characteristics of the sensor of the present invention.

The thermal loading member 71 serves to change the critical point 34 of the response characteristic as shown at 73 of FIG. 7 from a critical point of about 600 SCCM's to a new value of approximately 20 liters per minute such that the temperature difference caused by flow between the upstream and downstream resistors remains in the low flow regime, i.e., $\Delta T$ directly proportional to flow rate from 0 flow to 20 liters per minute. This greatly simplified the electronics required to cover the flow range from zero flow to 20 liters per minute. With the thermal loading, there is a loss of sensitivity. However, this sensitivity can be regained by increasing the power applied to the sensing resistors 12 and 13 and/or by increasing the gain utilized for amplifying the unbalance signal $\Delta E$.

Figure 24:
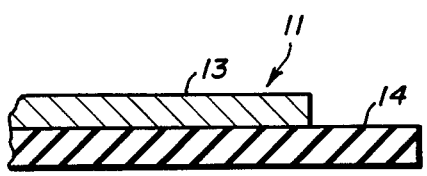
FIG. 24 is a sectional view of the structure of FIG. 1 taken along line 24—24 in the direction of the arrows and depicting an alternative embodiment of the present invention having faster response time.

Referring now to FIG. 24, there is shown a thermal fluid flow sensor 11 having faster response time. More particularly, the sensing resistors 12 and 13 are carried from one side of a single sheet 14 of flexible dielectric material with the sensing resistor 13 either exposed directly to the fluid flow being measured or separated therefrom by means of an extremely thin, i.e., 500 to 5000 Å thick film of passivating material, as of polyimide resin, or polytetrafluoroethylene, not shown.

Figure 25:
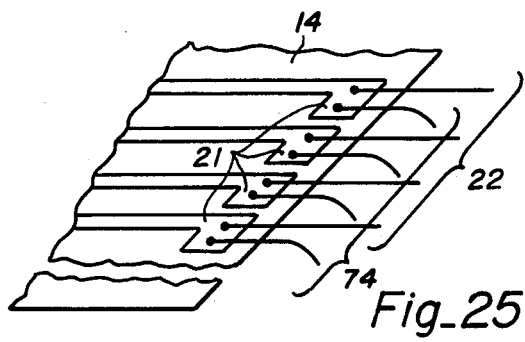
FIG. 25 is an enlarged, sectional view of a portion of the structure of FIG. 1 delineated by line 25—25 and depicting an alternatively lead attach arrangement.

Referring now to FIG. 25, there is shown an alternative method for sensing the resistance of the upstream and downstream resistors 12 and 13 and for driving them with the heating current. More particularly, separate leads 22 and 74 are attached to each pad 21 of the respective resistors 12 and 13 with leads 22 supplying the heating current and lead 74 being connected into a sensing bridge for sensing the temperature difference of the upstream and downstream resistors 12 and 13 as a function of fluid flow. By using separate leads 74 for sensing, changes in resistance of the power supply leads 22 are not detected, thereby avoiding sensing errors due to the temperature dependent effects of the heating leads 22.

Figure 26:
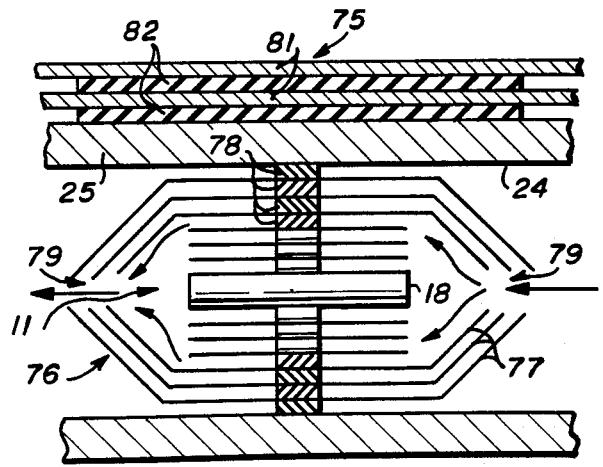
FIG. 26 is a view simlar to that of FIG. 3 depicting an alternative embodiment of the present invention incorporating thermal gradient shields.

Referring now to FIG. 26, there is shown an alternative embodiment of the present invention wherein thermal gradient shields 75 and 76 are provided between the thermal fluid flow sensor 11 and its surrounds for shielding the sensor 11 from external thermal gradients, thereby making the fluid flow measurement more insensitive to external thermal gradients. More particularly, the structure of FIG. 26 is substantially the same as that of FIG. 4 with the exception that a thermal gradient shield 76 has been disposed surrounding the fluid flow sensor 11. The thermal gradient shield 76 comprises a plurality of concentric cylindrical members 77 made of a thermally conductive material as of nickel, stainless steel, copper or aluminum, each thermally insulated from the other by means of thermal insulative members 78 as of plastic foam, rubber foam, or cork. Thermally insulative members 78 close off the gaps between adjacent gradient shield members 77 such that the fluid flow is constrained to flow through adjacent turns of the fluid flow sensor 11 and not through the spaces between adjacent cylindrical members 77. As an alternative, the cylindrical shield members 77 are thermally insulated, one with respect to the other, by means of a solid layer of thermally insulative material such as cork, plastic or rubber foam. The cylindrical gradient shield members 77 preferably have conical end portions which are centrally apertured at 79 to allow passage of the fluid therethrough into the sensor 11.

As an alternative, or in addition to the cylindrical gradient shield members 77, the exterior housing 25 may be covered with successive layers of thermally conductive and thermally insulative sheet material at 81 and 82, respectively, for shielding the fluid flow sensor 11 from external thermal gradients. In a typical example, thermally conductive layers 81 may comprise 10 mil thick aluminum sheet material and the thermally insulative layers 82 may comprise 0.125" thick cork or foam sheet material.

The advantages of the flow sensors of the present invention include: ability to sense very low flow rates with a relatively large, open structure, thereby eliminating the possibility of clogging and catastrophic failure often encountered with a bypass system utilizing a small capillary bypass having the thermal sensing elements carried thereon. In addition, the thermal fluid flow sensor of the present invention partitions the flow into laminar flow regions, thereby making the flow measurement insensitive to aerodynamic effects. Moreover, that embodiment of the present invention which includes a leader portion looped back and sealed to itself forms an integral electrical feedthrough structure and defines a portion of the fluid passageway through which the fluid to be measured flows, thereby simplifying the structure.

What is claimed is:

1. In a method for sensing fluid flow in a fluid passageway for containing the flow to be measured, the steps of:
   supporting a temperature dependent flexible sensing resistor on a flexible ribbon-shaped flow septum for immersion in said fluid passageway;
   immersing and meandering by flexure both said ribbon-shaped septum and sensing resistor within said fluid flow passageway so as to partition a preponderance of the flow therein into a plurality of side-by-side flow portions, each with a length, L, at least three times larger than its characteristic minimum cross-sectional dimension, D and each partitioned flow portion being disposed in heat-exchanging relation with said meandered sensing resistor; and deriving an electrical output signal from said meandered and flexed sensing resistor which is a function of the fluid flow for sensing the fluid flow.

2. The method of claim 1 wherein the step of supporting said sensing resistor on a flexible ribbon-shaped flow septum includes the step of, sandwiching said sensing resistor inbetween sheets of organic dielectric material.

3. The method of claim 2 wherein the organic dielectric material is polyimide resin.

4. The method of claim 1 wherein the step of meandering said ribbon-shaped septum to partition the flow includes the step of, winding the ribbon-shaped septum into a generally spiral configuration with the axis of revolution of the spiral being oriented generally parallel to the direction of flow through the spiral.

5. The method of claim 1 wherein the step of arranging said ribbon-shaped septum to partition the flow includes the step of meandering the ribbon-shaped septum back-and-forth in a serpentine path within the flow passageway.

6. The method of claim 1 including the step of supporting said first and a second sensing resistor on a common flexible ribbon-shaped flow septum, said second sensing resistor being disposed downstream of said first sensing resistor.

7. The method of claim 6 wherein the step of deriving an electrical output signal from said sensing resistors includes the step of:

deriving an electrical output signal from said first and second sensing resistors which is a function of the temperature difference between said sensing resistors produced by the flow of fluid in the passageway;

said derived output signal being characterized by a critical flow rate at which the amplitude of the temperature difference between said first and second sensing resistors changes from a direct function of flow rate to an inverse function of flow rate; and thermally loading said first and second sensing resistors as immersed and arranged within said fluid passageway so as to substantially increase the fluid flow rate corresponding to the critical flow rate, whereby the flow regime wherein the temperature difference between said first and second resistors is a direct function of flow rate is extended substantially to higher flow rates.

8. The method of claim 7 wherein the step of thermally loading said first and second sensing resistors includes the step of coupling a thermally conductive element in thermal exchanging relation with said first and second resistors.

9. The method of claim 8 wherein the step of arranging said ribbon-shaped septum to partition the flow includes the step of arranging said ribbon-shaped septum into an arcuate configuration with the axis of revolution of the arcuate configuration being oriented generally parallel to the direction of fluid flow through said arcuate configuration.

10. The method of claim 9 wherein the arcuate configuration of said ribbon-shaped septum is a spiral and wherein the step of coupling a thermally conductive element in thermal exchanging relation with said first and second resistors includes the step of arranging said thermally conductive element in interleaved relation with adjacent turns of said spirally wound septum.

11. The method of claim 6 including the step of:

thermally shielding said first and second sensing resistors with a plurality of thermal gradient shields for rendering the sensed flow measurement insensitive to externally produced thermal gradients.

12. The method of claim 1 wherein the step of supporting said sensing resistor on a flexible ribbon-shaped flow septum includes the step of, sandwiching said sensing resistor inbetween corrosion resistant flexible ribbon portions of a metallic material.

13. The method of claim 1 including the step of heating said septum to a temperature close to the temperature of said sensing resistor to reduce the time constant of the flow measurement.

14. In a thermal fluid flow sensor of the type having upstream and downstream resistor portions for sensing the flow of fluid through a passageway:

septum means of a thin flexible ribbon-shape for streamline immersion in the fluid within the passageway for partitioning the flow within the passageway into a plurality of side-by-side partitioned flow portions;

temperature dependent resistor means carried from said septum means with separate upstream and downstream resistor portions for sensing fluid flow within said partitioned passageway, and said septum means including a thin flexible layer portion having said resistor means carried thereon and said flexible layer portion and said resistor means being flexed and meandered within the passageway for partitioning the passageway into the side-by-side partitioned flow portions, each with a length L, at least three times larger than its characteristic minimum cross-sectional dimension, D and each flow portion being disposed in heat-exchanging relation with said meandered resistor means.

15. The apparatus of claim 14 wherein said layer portion of flexible material is selected from the group consisting of polyimide resin, stainless steel and monel.

16. The apparatus of claim 14 including spacer means for spacing said septum from adjacent structure to determine a characteristic minimum cross-sectional dimension, D, of said partitioned flow portions and for holding said septum means in streamline orientation relative to the flow direction within said passageway and wherein D is less than the width of said ribbon-shaped septum means.

17. The apparatus of claim 16 including thermal gradient shield means disposed inbetween said septum means and its surrounds for shielding said upstream and downstream resistor portions from thermal gradients within the surrounds of said septum.

18. The apparatus of claim 17 wherein said thermal gradient shield means includes a plurality of layers of thermally conductive material separated one from the other by means of a thermally insulative region.

19. The apparatus of claim 14 wherein said septum means is wound into a spiral.

20. The apparatus of claim 19 including a spacer structure separating adjacent turns of said spiral.

21. The apparatus of claim 19 including, thermal loading element means interleaved between adjacent turns of said spiral wound septum means for thermally loading said separate upstream and downstream resistor portions.

22. The apparatus of claim 21 wherein said thermal loading element means is made of metal.

23. The apparatus of claim 21 wherein said interleaved thermal loading element is spaced on both sides from adjacent turns of said spiral wound septum by means of fluid flow passageways.

24. The apparatus of claim 14 wherein said septum means is meandered back and forth.

25. The apparatus of claim 14 wherein a portion of said septum means is looped back on itself to define the inside wall portion of the fluid flow passageway containing said resistor means.

26. The apparatus of claim 25 wherein said looped back portion of said septum means has an opening from its outside surface to expose terminals of said resistor means from the outside of said defined flow passageway to define a hermetically sealed electrical feedthrough structure for electrically contacting said resistor means through the wall of said flow passageway.

27. The apparatus of claim 14 including heater means separate of said resistor means and coupled in heat exchanging relation with said septum for heating said septum means to a temperature nearly the same as that of said sensing resistor means for reducing the time constant of the flow measurement.

* * * * *